(12) United States Patent
Xie

(10) Patent No.: US 7,732,081 B2
(45) Date of Patent: Jun. 8, 2010

(54) HYDROPHILIC/HYDROPHOBIC PATTERNED SURFACES AND METHODS OF MAKING AND USING THE SAME

(75) Inventor: Tao Xie, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/119,652

(22) Filed: May 13, 2008

(65) Prior Publication Data
US 2008/0292940 A1 Nov. 27, 2008

Related U.S. Application Data

(60) Provisional application No. 60/939,674, filed on May 23, 2007.

(51) Int. Cl.
*H01M 2/00* (2006.01)
*H01M 2/02* (2006.01)
*H01M 8/10* (2006.01)
*H01M 4/00* (2006.01)

(52) U.S. Cl. .............................. 429/34; 429/30; 429/33; 429/42; 429/44

(58) Field of Classification Search ................... 429/34, 429/30, 33, 42, 44
See application file for complete search history.

(56) References Cited

U.S. PATENT DOCUMENTS 6,723,814 B2 * 4/2004 Meier et al. ................. 526/279

7,020,355 B2 * 3/2006 Lahann et al. ................ 385/16
2006/0040164 A1 * 2/2006 Vyas et al. ..................... 429/34

FOREIGN PATENT DOCUMENTS

EP 0629015 A1 * 4/1994

OTHER PUBLICATIONS

Jiang et al., "Polymers Move In Response to Light," Adv. Mater. 2006, 18, 1471-1475).*
Tsujioka et al., A New Preparation Method for Well-Controlled 3D Skeletal Epoxy Resin-Pased Polymer Monoliths, Macromolecues, Nov. 29, 2005, vol. 38, No. 24, pp. 9901-9903.
Lim et al., Photoreversibly Switchable Superhydrophobic Surface with Erasable and Rewritable Pattern, J. Am. Chem. Soc., 128, 2006, pp. 14458-14459.
Liu et al., Controlled Switchable Surface, Chem. Eur. J., 11, 2005, pp. 2622-2631.
Lahann et al., Smart Materials with Dynamically Controlled Surfaces, MRS Bulletin, Mar. 2005, vol. 30, pp. 185-188.
U.S. Appl. No. 12/119,647, filed May 13, 2008; Inventor: Tao Xie, Title: Three-Dimensional Hydrophilic Porous Structures for Fuel Cell Plates.

* cited by examiner

Primary Examiner—Jerry Lorengo
Assistant Examiner—Eli Mekhlin
(74) Attorney, Agent, or Firm—Reising Ethington P.C.

(57) ABSTRACT

One embodiment includes a substrate having a plurality of molecular chains, each chain comprising a hydrophilic group, a hydrophobic segment, and a reversible crosslinker.

10 Claims, 3 Drawing Sheets

HYDROPHILIC/HYDROPHOBIC PATTERNED SURFACES AND METHODS OF MAKING AND USING THE SAME

This application claims the benefit of U.S. Provisional Application No. 60/939,674, filed May 23, 2007.

TECHNICAL FIELD

The field to which the disclosure generally relates includes hydrophilic/hydrophobic patterned surfaces, products including the same and methods of making and using the same.

BACKGROUND

Products having hydrophilic or hydrophobic surfaces have broad applications running from proton absorption, water transport (e.g. fuel cells), friction control, etc. On a superhydrophobic surface, water stays in a droplet form and rolls off easily when the surface is slightly tilted. Achieving superhydrophobicity usually requires texture on the surface such as the well-known lotus leaves. On a typical flat hydrophobic surface, a water contact angle of as high as 110° can be achieved.

Water, when dropped on a superhydrophilic surface (water contact angle below 20 degree), spreads simultaneously in a radial fashion. If the superhydrophilic surface contains micro-channel features, water wicks into the channels and moves quickly along the channels due to the additional capillary force, with the velocity depending on the channel size. This water wicking behavior has been found particularly useful in facilitating water transport in micro-channels.

SUMMARY OF EXEMPLARY EMBODIMENTS OF THE INVENTION

One embodiment of the invention includes a substrate having molecular chains attached thereto, each chain comprising a hydrophilic group, a hydrophobic segment, and a photo-reversible crosslinker.

Another embodiment of the invention includes a substrate having a reconstructable hydrophobic/hydrophilic patterned surface comprising a plurality of molecular chains, each chain containing a hydrophilic group, a hydrophobic segment and a photo-reversible crosslinked portion.

One embodiment of the invention includes a method including providing a substrate having a plurality of molecular chains attached thereto, each chain comprising a hydrophilic group, a hydrophobic segment, and a reversible linker, and causing the reversible linker to crosslink adjacent molecular chains.

Another embodiment of the invention comprises providing a substrate having a plurality of molecular chains attached thereto, each chain comprising a hydrophilic group, a hydrophobic segment, and a photo-reversible crosslinker, exposing the substrate to a charge and thereafter exposing the molecular chains to ultraviolet light to crosslink adjacent molecular chains. In one embodiment of the invention, the substrate is exposed to a positive charge, causing the molecular chain to straighten and so that the hydrophilic group is furthest from the substrate. In another embodiment, the substrate is subjected to a negative charge causing the molecular chains to bend over so that the hydrophilic group is attached to the substrate.

Another embodiment of the invention includes providing a substrate having a plurality of molecular chains, each chain containing a hydrophilic group and a hydrophobic segment and wherein adjacent chains are connected together by a reversible crosslinked portion, and causing the crosslinked adjacent molecular chains to be uncrosslinked by exposing the chains to ultraviolet light. In one embodiment of the invention, the crosslinked chains are exposed to ultraviolet light of a wavelength less than 260 nm.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

One embodiment of the invention includes a channel-less fluidic device. In one embodiment, a surface with both hydrophobic and hydrophilic micro or nano-patterns (e.g. strips) is created through careful molecular design. By selectively forming hydrophilic and hydrophobic patterns on the surface, wherein in some cases the contact angle difference can be as large as 100°, water dropped onto such a pattern surface is expected to behave as a micro-channeled superhydrophilic surface with the border between the hydrophobic and superhydrophilic area acting as a virtual channel wall. In one embodiment, the molecular design can make the virtual water channel reconstructable, as described hereafter.

Figure 1:
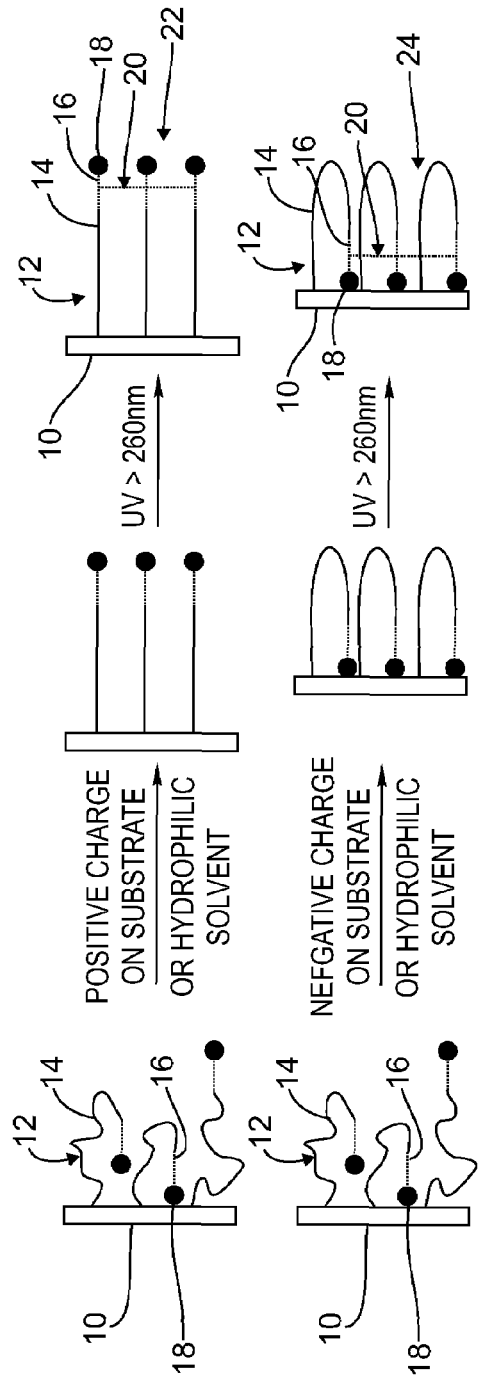
FIG. 1 illustrates a method of forming hydrophilic surfaces and hydrophobic surfaces on a substrate.

As shown in FIG. 1, one embodiment of the invention includes a substrate 10 modified with a plurality of molecular chains 12, with each chain 12 including a hydrophilic group 18, a hydrophobic segment 14, and a reversible cross linker portion 16. In one embodiment, to create hydrophobicity, fluorocarbon chains may be used as the hydrophobic segments 14. Hydrophilicity may be created with polar groups 18. In one embodiment, the hydrophilic group 18 may be a carboxylic acid (or salt) group. In one embodiment, the polar groups are ionic groups and introduce superhydrophilicity. In one embodiment, adjacent molecular chains 12 are crosslinked together which tends to stabilize surface superhydrophilicity unlike uncrosslinked superhydrophilic surfaces which are prone to hydrophilicity loss over time when exposed to air. In one embodiment, the reversible cross linker portion 16 may be a cinnamic acid link.

Figure 2:
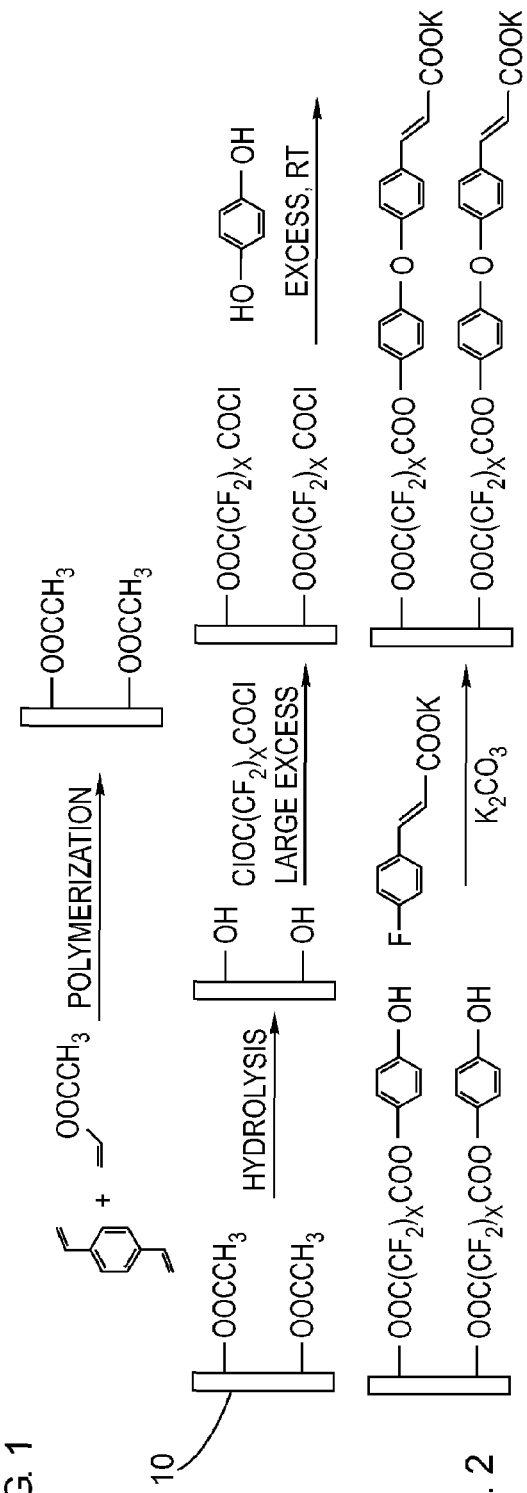
FIG. 2 illustrates a method of surface modification of a substrate according to one embodiment of the invention.

Referring now to FIG. 2, in one embodiment of the invention, a substrate 10 may be created, for example, by the copolymerization of vinyl acetate with a small amount of divinyl benzene used as a curing agent. Hydrolysis occurs on a surface and generates hydroxyl groups, which react further with perfluoro dicarbonyl chloride. The perfluoro dicarbonyl chloride may be used in large excess to avoid diesterification. Phenol groups are generated in the next step through the reaction between carbonyl chloride groups and an excessive amount of dry hydroquoine. In the final step, cinnamic acid structural units are introduced onto the surface through the phenol groups. This chemistry produces a surface that contains fluorocarbon chains with hydrophilic carboxylic acid or salt end groups, linked together by crosslinkable double bonds.

Referring again to FIG. 1, by imposing positive charges on the substrate 10 through a DC e-field or soaking the substrate in a hydrophilic solvent, the molecular chains 12 on the substrate surface are stretched with the ionic groups 18 pointed away from the surface. The sample may be exposed to ultraviolet light of wavelength greater than 260 nm to promote UV curing through the photo-dimerization of cinnamic acid linkages. The end result is a crosslinked superhydrophilic surface 22 with ionic groups 18 on top.

Also as illustrated in FIG. 1, when a negative charge is imposed on the substrate 10 or a hydrophobic solvent is used, the opposite occurs. That is, the chains 12 bend over so that the ionic group 18 attaches to the substrate 10. This produces a hydrophobic surface 24 dominated by fluorocarbon segments 14 of the chains 12 which is expected to have a contact angle of about 110°.

The invention is not limited to the specific arrangement of components 14, 16, and 18 of the molecular chain 12 as shown in FIG. 1. For example, the hydrophilic component 18 need not be located at the end of the molecular chain 12 nor does the crosslinkable portion 16 need to be located adjacent the hydrophilic component 18. Further, additional segments or groups may be interposed between components of the molecular chain 12 or attached to the ends thereof. For example, an additional group or segment may be attached to the hydrophobic segment 14 to attach or anchor the molecular chain 12 to the substrate 10.

Due to spatial selectivity of ultraviolet reactions, patterns of hydrophobicity and superhydrophilicity can be created in different areas of the same substrate by sequentially employing the above-described two processes and the use of a photomask on opposite patterns. The feature size of the patterns can be as low as nanometers due to the excellent spatial resolution of ultraviolet wavelengths.

The crosslinking reaction can also be reversed by exposing the patterned surface to ultraviolet light of wavelengths less than 260 nm, characteristic of cinnamic acid based systems. When the cross linking bonds are cleaved, the surface returns to its original state and the superhydrophilicity and hydrophobicity patterns are erased. By repeating the two processes shown in FIG. 1 using a mask on different features, new patterns of superhydrophilicity and hydrophobicity can be recreated.

Figure 3:
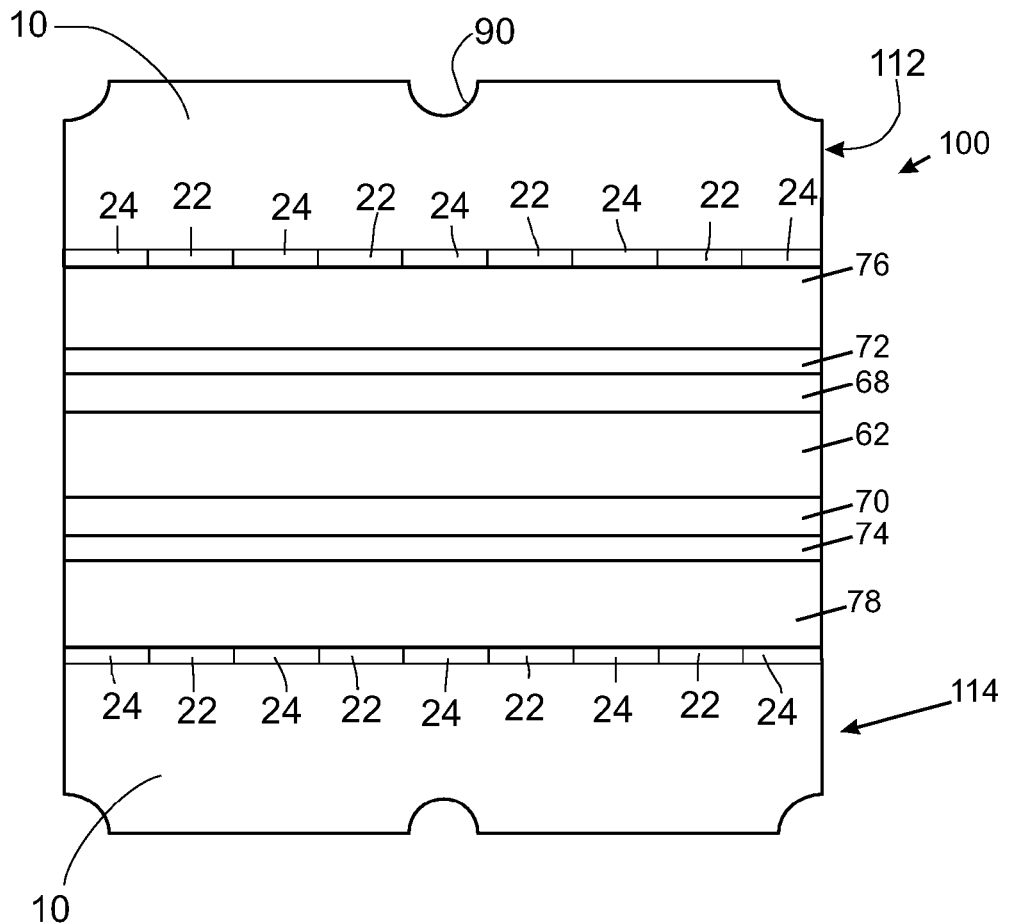
FIG. 3 illustrates a product according to one embodiment of the invention.

Referring now to FIG. 3, another embodiment of the invention includes a fuel cell stack 100 including a substrate 10 that may be a first fuel cell bipolar plate 112. The surface of the first bipolar plate 112 may be modified to include a pattern of hydrophilic 22 and hydrophobic regions 24. Optionally, the first bipolar plate 112 may include channels 90 formed in an opposite face for flow a coolant therethrough. A first gas diffusion media layer 76 may underlie the first bipolar plate 112. The first gas diffusion media layer 76 is porous and typical formed of carbon papers arranged as carbon paper or felt. A first microporous layer 72 may be provided underlying the first gas diffusion layer 76. The first microporous layer 72 may include carbon particles and PTFE. A cathode 68 may underlie the first microporous layer 72 and may include a catalyst such as platinum on carbon particles and an ionomer such as NAFION. A polyelectrolyte membrane (PEM) 62 may be provided underlying the cathode and may include an ionomer such as NAFION. An anode 70 may underlie the membrane 62 and may be similarly constructed as the cathode 68. A second microporous layer 74 may underlie the anode 70 and a second gas diffusion media layer 78 may underlie the second microporous layer 74. A second bipolar plate 114 may underlie the second gas diffusion media layer 78. In the embodiment shown in FIG. 3, reactant gases are each respectively forced through the respective gas diffusion media layers 76, 78. Any liquid water present due to condensation of humidified gases or created as a byproduct of the fuel cell reaction may wick along the hydrophilic regions 22 of the surface of each bipolar plate 112, 114 and be removed from the cell if desired.

Figure 4:
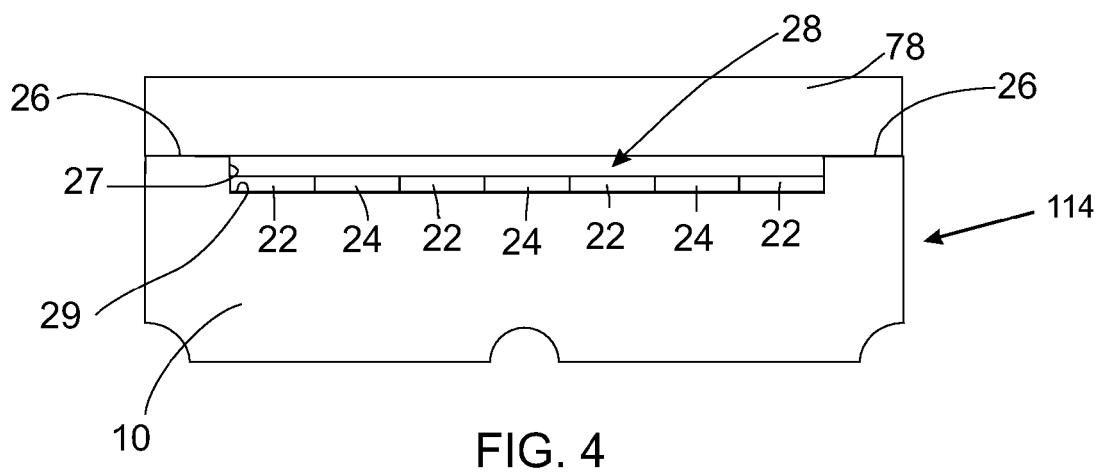
FIG. 4 illustrates a product according to another embodiment of the invention.

Referring now to FIG. 4, the second bipolar plate 114 may have at least two lands 26 and one channel (gap or space) 28 formed between the lands. The channel 28 may be defined by walls 27 of the land 26 and a floor surface 29. The floor surface may be modified to include a pattern of hydrophilic 22 and hydrophobic regions 24. The lands 26 make physical and electrical contact with the second diffusion media layer 78. A reactant gas, such as but not limited to hydrogen, flows through the channel 28, and diffuses through the gas diffusion layer 78 to the anode. Any liquid water present due to condensation of humidified gases or created as a byproduct of the fuel cell react may wick along the hydrophilic regions 22 of the surface of each bipolar plate 112, 114 and be removed from the cell if desired. The gas flowing in the channel 28 may help to push the water out of the cell.

Figure 5:
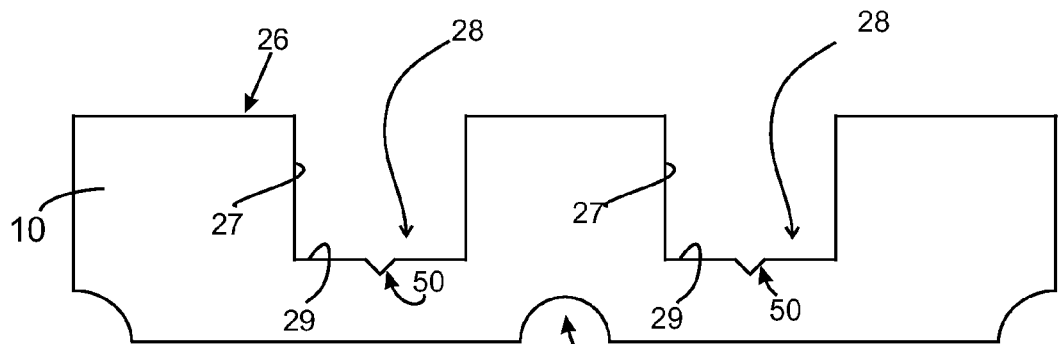
FIG. 5 illustrates a prior art fuel cell bipolar plate with a microgroove.
Figure 6:
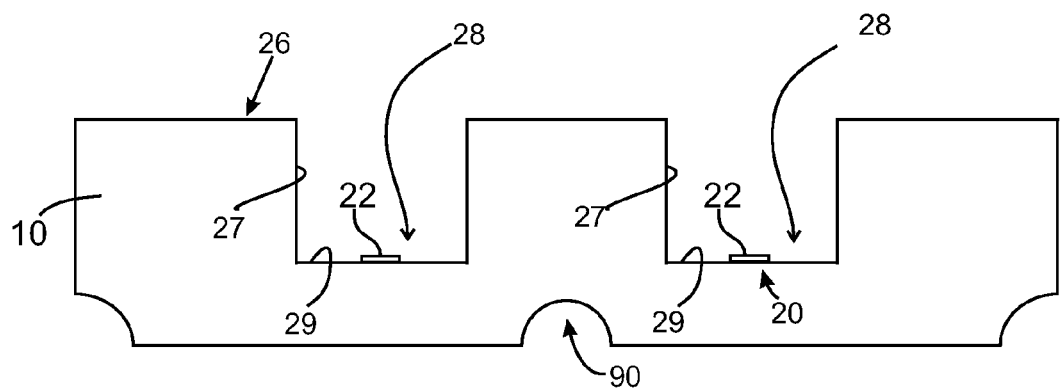
FIG. 6 illustrates a product according to another embodiment of the invention.
Figure 7:
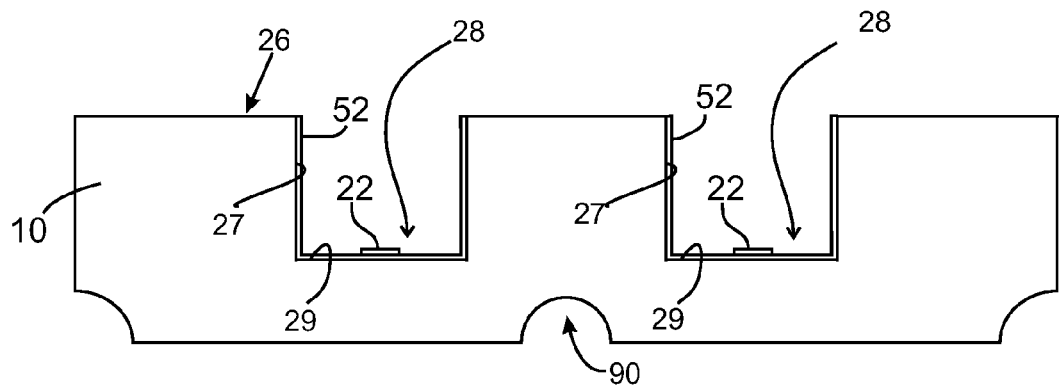
FIG. 7 illustrates a product according to another embodiment of the invention.

FIG. 5 illustrates a prior art fuel cell bipolar plate with a microgroove 50 formed in the floor 29 of the surfaces defining the channel 28. According to one embodiment, as shown in FIG. 6, one or more virtual microgrooves may be formed along the floor 29 or walls 27 defining the channel 28 by providing a region 22 comprising a polarity of crosslinked molecular chains comprising a hydrophilic group or segment. As shown in FIG. 7, the substrate 10 may be a metal such as stainless steel, and a polymeric coating 52 may be provided in the channel 28 along a portion of the wall 27 and/or floor 29. A region 22 comprising a plurality of crosslinked molecular chains comprising a hydrophilic group or segment may be provided on the coating 52. The molecular chains may be a part of the coating 52 or attached thereto. In one embodiment the width of the region 22 defining the virtual microgroove may be less than 50 μm. The channel may have a variety of configurations and may also be semicircular or V-shaped.

The above description of embodiments of the invention is merely exemplary in nature and, thus, variations thereof are not to be regarded as a departure from the spirit and scope of the invention.

What is claimed is:

1. A method comprising providing a substrate having a plurality of molecular chains attached thereto, each chain comprising a hydrophilic group, a hydrophobic segment, and a reversible linker; causing the reversible linker to reversibly crosslink adjacent molecular chains to change a surface of the substrate from hydrophilic to hydrophobic or from hydrophobic to hydrophilic; causing at least some of the molecular chains to straighten and so that the hydrophilic group is furthest from the substrate; and causing at least some of the molecular chains to bend over so that the hydrophilic group is attached to the substrate.

2. A method comprising providing a substrate having a plurality of molecular chains attached thereto, each chain comprising an ionic hydrophilic group, a hydrophobic segment, and a photo-reversible crosslinker; exposing the substrate to a charge opposite to the charge on the ionic hydrophilic group, causing at least some of the molecular chains to straighten and so that the hydrophilic group is furthest from the substrate; exposing the substrate to a charge the same as the charge on the ionic hydrophilic group, causing at least some of the molecular chains to bend over so that the hydrophilic group is attached to the substrate; and thereafter exposing the molecular chains to ultraviolet light to crosslink adjacent molecular chains.

3. A method as set forth in claim 2, wherein the crosslinked chains are exposed to ultraviolet light of a wavelength less than 260 nm to uncrosslink the same.

4. A method comprising providing a substrate with hydroxyl groups attached thereto, reacting the hydroxyl groups with perfluoro dicarbonyl chloride to provide a chlorinated segment attached to the substrate, reacting the chlorinated segment with an excessive amount of dry hydroquoine to produce attached phenol groups, reacting the phenol groups with cinnamic acid to provide molecular chains attached to the substrate, the molecular chains comprising a fluorocarbon segment, crosslinkable double bonds, and hydrophilic carboxylic acid or salt end groups.

5. A method as set forth in claim 4, further comprising imposing positive charges on the substrate through a direct current electric field or exposing the molecular chains to a hydrophilic solvent so that the chains on the surface are stretched with the ionic groups pointed away from the surface.

6. A method as set forth in claim 5, further comprising exposing the molecular chains to ultraviolet light of wavelength greater than 260 nm to promote UV curing through the photo-dimerizationf cinnamic acid linkages to provide crosslinked adjacent molecular chains.

7. A method as set forth in claim 6, further comprising exposing the crosslinked molecular chains to UV light of wavelength less than 260 nm to uncrosslink adjacent molecular chains.

8. A method as set forth in claim 4, further comprising imposing a negative charge on the substrate or exposing the molecular chains to a hydrophobic solvent so that the chains bend over and so that the ionic group attaches to the substrate.

9. A method comprising providing a substrate having a plurality of molecular chains attached thereto, each chain comprising a hydrophilic group, a hydrophobic segment, and a reversible linker, and causing the reversible linker to crosslink adjacent molecular chains, further comprising causing at least some of the molecular chains to bend over so that the hydrophilic group is attached to the substrate.

10. A method comprising providing a substrate having a plurality of molecular chains attached thereto, each chain comprising a hydrophilic group, a hydrophobic segment, and a reversible linker, and causing the reversible linker to crosslink adjacent molecular chains wherein the hydrophilic group is ionic, the exposing the substrate to a charge comprises exposing the substrate to a charge the same as the charge on the ionic hydrophilic group, causing at least some of the molecular chains to bend over so that the hydrophilic group is attached to the substrate.

\* \* \* \* \*